July 24, 1962 J. W. MANN ETAL 3,046,181
PROCESS OF FINGER JOINT END GLUING
Filed Feb. 13, 1958 2 Sheets-Sheet 1

INVENTORS
JULIUS W. MANN
GEORGE F. RUSSELL
BY Munn & Liddy
ATTORNEYS

July 24, 1962  J. W. MANN ETAL  3,046,181
PROCESS OF FINGER JOINT END GLUING
Filed Feb. 13, 1958  2 Sheets-Sheet 2

INVENTORS
JULIUS W. MANN
GEORGE F. RUSSELL
BY Munn & Liddy
ATTORNEYS

United States Patent Office 3,046,181
Patented July 24, 1962

3,046,181
PROCESS OF FINGER JOINT END GLUING
Julius W. Mann and George F. Russell, both of 711 St.
Helens Ave., Tacoma, Wash.
Filed Feb. 13, 1958, Ser. No. 715,021
2 Claims. (Cl. 156—274)

The present invention relates to improvements in a process of finger joint end gluing. It consists of the steps of the process hereinafter described and claimed.

In the lumber industry, myriads of short pieces sawn from longer units of lumber have in the past been burned so as to be rid of a waste problem. With the cost of timber increasing and its availability lessening, lumber operators have for years sought means of using such shorts to recover whatever value may be salvaged. Numerous schemes have been applied to such short pieces for making them into longer pieces, so as to dispose of them at better values. Scarfing of shorts has been resorted to in the production of long members from which laminated rafters, ship keels and like products have been produced, utilizing resin adhesive as a bonding agent between the individual units of scarfed wood, and often times utilizing the internal heating effect of the high frequency alternating current field of force to accelerate the setting of such adhesives.

We have applied high frequency heating to many such applications in the past but with mediocre success until we invented the process of parallel bonding described and claimed in our Patent No. 2,434,573, granted January 13, 1948. Parallel bonding may be described as a process wherein an adhesive surface is so placed between electrode elements charged with a high frequency alternating current field of force and is so disposed as to parallel the dominant field lines of force of the said field. In the case of an adhesive surface placed between two parallel but oppositely charged electrode elements, the adhesive surface is subjected to parallel bonding when it is placed between the electrodes parallel to an imaginary straight line connecting the electrodes at their closest points and being perpendicular to the planes of the electrodes, since the dominant field lines of force stand perpendicular to the plane surfaces of and between the parallel, opposing and oppositely charged electrodes. Invention of the process of parallel bonding materially speeded up the setting of resin adhesives in wood laminates and has greatly advanced the technology of wood utilization. Setting scarfed joints by the parallel bonding process speeded cures of adhesive as much as ten to one compared to the previously known methods termed perpendicular bonding, but certain tendencies to arc in the adhesive surface caused drawbacks to the setting of scarfed joints, which when added to the difficulty of curing the feather tips of the scarfed pieces, led us to the invention of the heat-retention electrode configuration which is described and claimed in our copending application, Serial No. 417,068, filed March 18, 1954, now Patent No. 2,824,200, which may be employed either for perpendicular bonding of scarfed joints or the parallel bonding of many and varied shapes of glued joints.

A heat-retention electrode element may be described as a unit configuration having a metallic "live" electrode connected to a source of high frequency alternating current, and a parallel metallic "idler" element separated from the "live" electrode by a layer of high loss dielectric such as but not limited to asbestos. Such a heat-retention unit is used in the present case as will be described hereinafter more fully.

When a high loss dielectric is placed between live electrodes connected to a source of high frequency alternating current, heating of the dielectric will take place.

We have found and have pointed out in our copending application Serial No. 417,068, the fact that when heat-retention electrodes consisting of the components above described are employed to heat a dielectric therebetween, not only is the said dielectric heated by high frequency but also the high loss layers of dielectric between the "live" and "idler" elements of the heat-retention electrodes are also heated thereby. In turn, therefore, the metallic "idler" elements of the heat-retention electrode elements are heated by conduction from the layers of high loss dielectric between the "live" and hot elements, and the "idler" elements will remain hot during operation, and will possess a residual of heat which will be transferred to any dielectric which contacts them on their surfaces opposite to that to which the isolating layers are attached. Such a quality permits conduction heating of the surfaces of any material contacting it, or passing by on its travel through heat-retention electrode elements.

Of recent development is a joint called a "finger joint," so designated due to its similarity with fingers of the hand which, when inserted into complementary recesses provided between fingers on the end of another piece of lumber, facilitates joining the pieces with less waste of wood than in the case of a scarfed joint. While a scarf of one to twelve ratio in one inch lumber takes twelve inches of each end of the board to form the scarf, multiple fingers in the ends of one inch boards may be no more than an inch or two in depth and there will be less loss of wood. Resin adhesive, when spread in the interdigitated fingers of such joints, and subjected to the internal heating effect of the high frequency alternating current field of force, has the quality of rapid setting under the effect of the parallel bonding process patent mentioned above, but even utilizing other radio frequency heating techniques produces joints which save substantially the length of short pieces when so finger-laminated end to end. It is to an improvement in the process of setting the adhesive in such intermeshing finger joints in the ends of adjacent pieces of wood to which this invention applies; having commercial practicability, novelty and usefulness and has not, to our knowledge previously been employed.

We have found that placing a glue spread wood finger joint in a high frequency alternating current electric field of force when the field of force is applied by heat-retention electrodes permits parallel bonding without any arcing tendency, and it is therefore of tremendous value as a means of furthering conservation of wood resources. This quality of reduced arcing while speed setting of resin adhesives applies to ureas, melamines, resorcins, phenols and other combinations of compounds, generally termed as thermal-setting types.

The finger joints of the kind generally display a single cut on two opposite edges of the wood joined together and extending at right angles to the planes of the pieces while the zig-zag cuts appear on the two inner abutting edges of the square or oblong cross-section wood pieces. The process herein disclosed is equally satisfactory whether the zig-zag shaped edges are in the wide or the narrow opposing sides of oblong cross-sectioned wood pieces.

Naturally when the fingers of two end enmeshing pieces of lumber spread with an adhesive are placed together some squeeze out of adhesive will appear on the outer surfaces of the joint. Parallel bonding effect will set the squeeze out portion on the straight line of the joint extending between the planes of the electrode elements, but in the past prior to use of heat-retention electrode elements the edge squeeze out would remain unset and wet. With the ability of the "idler" element of the heat-retention electrodes to transfer heat by conduction to the surface of the joint adjacent thereto, heat will be applied to set by conduction heating the squeeze out from that part of the finger joint in contact with the "idler" element.

The process of parallel bonding finger joints in heat-retention electrode configurations herein described is particularly effective when the finger-jointed and glue-spread enmeshed pieces aligned one after another form a long continuous ribbon of wood and move rapidly and continuously through elongated heat-retention electrodes, the adhesive being cured therein and the ribbon of wood being cut to desired lengths after emergence from the electrodes. The elongated electrodes may be several feet in length, a make up and crowder section causing continuous forward motion to the ribbon preceding the passage of the ribbon of wood between the heat-retention electrode configurations, and a retarding means may also be applied to the ribbon of wood for creating a desirable constant pressure at the adhesive joints while the pieces are moving between the electrode configurations. Thus end pressure may be maintainable on the forward moving ribbon of wood while it progresses through the electrode section, while the adhesives in interstices of the enmeshing finger joints is cured by the effect of the high frequency alternating current field of force during passage therethrough.

Other objects and advantages will appear as the specification continues. The novel features will be set forth in the claims hereunto appended.

Drawings

For a better understanding of the invention, reference should be had to the accompanying drawings, forming part of this specification, in which.

Figure 3:
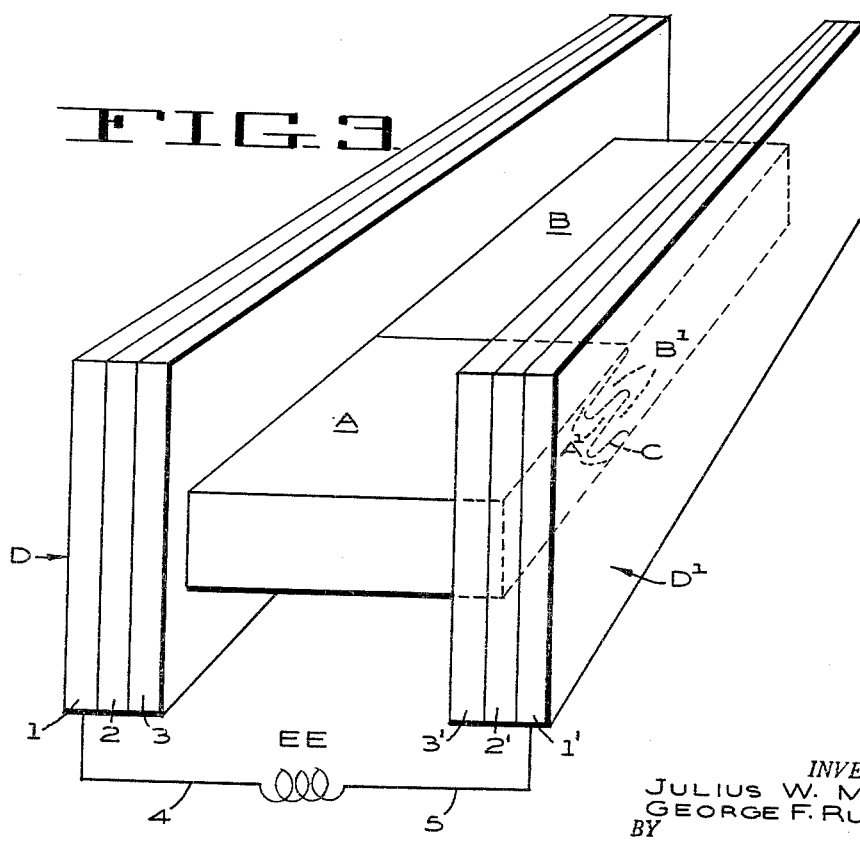
FIGURE 3 is a perspective view of an enmeshed finger joint assembly, the dotted lines showing through one composite heat-retention electrode unit to indicate the position of the zig-zag cut between the abutting pieces in relation to the electrode configurations.
Figure 4:
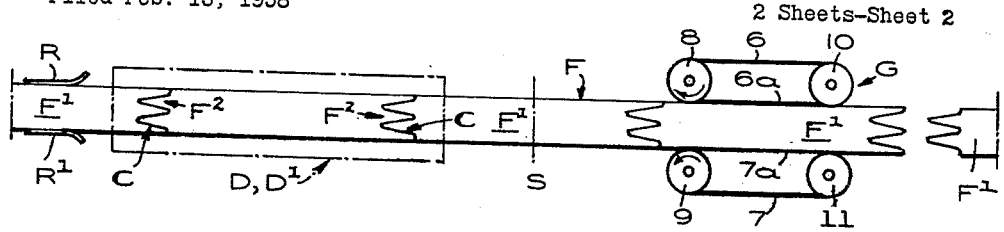
Figure 5:
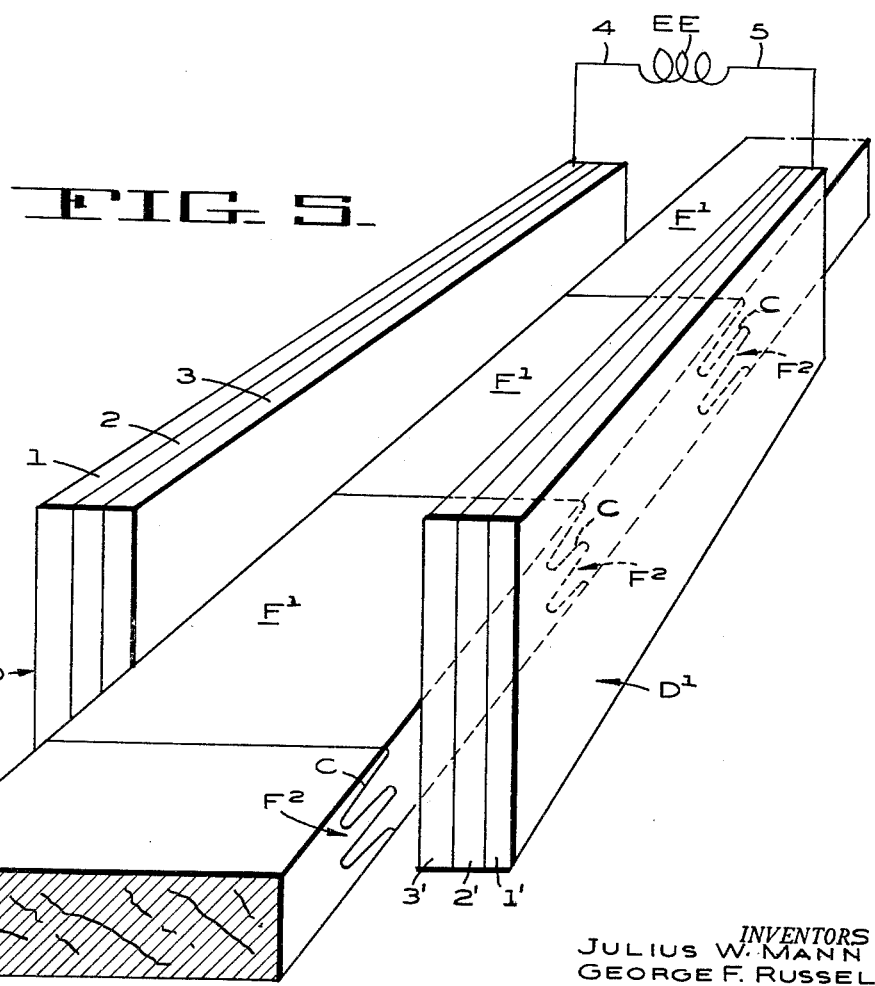

FIGURE 4 is a schematic view of a continuous method for R.F. bonding of finger jointed pieces following in succession; and FIGURE 5 is a perspective view similar to FIGURE 3, but illustrating a number of finger jointed pieces passing in continuous succession between heat-retention electrodes for R.F. parallel bonding the zig-zag adhesive surfaces lying between the adjacent pieces, the pieces being continuously moved by the means shown in FIGURE 4.

While we have shown only the preferred forms of our invention, it should be understood that various changes or modifications, may be made within the scope of the appended claims without departing from the spirit thereof.

Detailed Description

For the purpose of this specification a single heat-retention electrode such as D shown in FIGURE 3 working against electrical ground in case of a single ender R.F. generator, or dual heat-retention electrodes in the case of a double ender R.F. generator should be considered as being equivalent in operation, even though the double ender configurations are shown in the illustration of FIGURE 3, such differentiations should not limit the scope of the specification, or of the appended claims.

Figure 1:
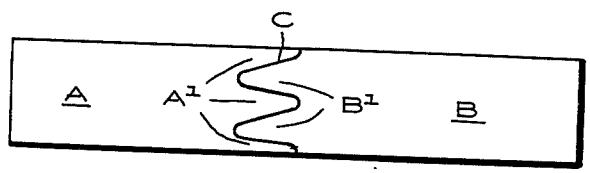
FIGURE 1 is a side view of opposite edges of enmeshed finger jointed abutting pieces of wood, exposing the zig-zag shape of the adhesive surface that lies between the two pieces and bonds them together when the adhesive is set.
Figure 2:
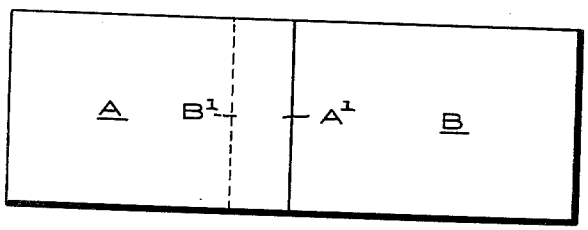
FIGURE 2 is a top plan view of FIGURE 1.

FIGURES 1 and 2 illustrate side and top plan views of two pieces A and B, provided with finger joint abutting edges. The piece A has fingers $A^1$ that are spaced apart to receive fingers $B^1$ of the piece B. The fingers of both pieces snugly engage each other and provide a zig-zag surface between both pieces. Adhesive, such as glue C, is applied to one or both sets of fingers before they are brought into interlocking position and a zig-zag glue or adhesive surface C lies between the two abutting pieces. The pieces A and B are preferably the same dimensions in cross-section and may have varying numbers of fingers, differing in length and design of cut.

A finger joint assembly in 2" x 10" lumber pieces using melamine-urea adhesive has been placed between heat-retention electrodes D and $D^1$ in FIGURE 3. Each heat-retention electrode D and $D^1$ is identical to the other, and therefore a description of the electrode D on the left-hand side of FIGURE 3 will suffice for both, and the same parts in electrode $D^1$ will be given the same reference numerals as the electrode D, but the numerals will be primed. The heat-retention electrode D has a metallic "live" element 1, a high-loss dielectric member 2 approximately of the same size as the element 1 and contacting it, and a metallic "idler" element 3 approximately the size of the member 2 and held in contact therewith. The three members are held together by any means desired, but the "live" electrode 1 is not galvanically connected to the "idling" electrode 3. The two "live" electrodes 1 and 1' are connected by leads 4 and 5, respectively, to a high frequency generator EE. We prefer to use the H.F. generator circuit disclosed in our Patent No. 2,506,158, issued May 2, 1950, and entitled "Single Standing Wave Radio Circuit," but others are effective and usable as well.

In actual practice, two heat-retention electrodes (corresponding to D and $D^1$ in FIGURE 3) were connected to an electronic generator EE of double ender output type having a high frequency output rating of 40,000 B.t.u.'s per hour, and the pieces A and B were placed between the electrodes D and $D^1$ so as to be exposed to the field of force and have the zig-zag adhesive surface parallel the field lines of force with the result that the adhesive surface set solid in as few as five seconds' time. In such an instance of a batch process the lumber would be stationary during the cure cycle. But the setting of the adhesive surface while this enmeshed finger joints are in forward movement gives startling results.

In FIGURES 4 and 5, we show schematically the continuous method of passing a ribbon of wool F, formed from a plurality of pieces $F^1$, interconnected by finger joints, between heat-retention electrodes D and $D^1$ for the bonding of the joints by R.F. parallel bonding. A feed section G is shown in FIGURE 4, as comprising a plurality of upper and lower endless elastic belts 6 and 7, respectively, that extend around drive pulleys 8 and 9 and idler pulleys 10 and 11. The drive pulleys 8 rotate in the direction of the arrow and tension is created on the lower reaches 6a of the endless belts 6 in moving the pieces $F^1$ to the left in FIGURE 4. In like manner, the drive pulleys 9 rotate in the direction of the arrow and tension is created on the upper reaches 7a of the endless belts 7 in moving the pieces $F^1$ to the left.

The feed section G moves the pieces $F^1$ into the electrode section D, $D^1$, that is composed of the heat-retention electrodes discussed above. The heat-retention electrodes D and $D^1$ are placed on opposite sides of the ribbon of wood F or other dielectric material, and therefore a perfect R.F. parallel bonding of the adhesive surface C between the interdigitated fingers of each finger joint will take place. A predetermined yielding pressure against the upper and lower surfaces of the pieces $F^1$ and the ribbon F is maintained at all times by the reaches 6a and 7a.

Any other means used as a substitute for the drive section G may be found acceptable to give forward movement to the web $F^1$; the retarding means R, $R^1$ working yieldingly against the forward movement furnished by the feeding means G, closes the finger joints $F^2$, prior to their entry into the electrode area D, $D^1$. It has been found also that a first retarding section can be employed between the feeding means G and the electrode area D, $D^1$, as for example at S. The retarding section S may be similar in structure to the retarding means R, $R^1$.

The tendency for arcing between the "live" elements 1 and 1' and the wet adhesive that might contact the "idling" elements 3 and 3' is practically eliminated because the "idling" elements 3 and 3' are kept to an elevated temperature and isolated from the hot elements, and any adhesive striking these will be polymerized almost instantaneously and therefore will not adhere to the metal. This effect is described in our co-pending application, Serial No. 417,068, filed March 18, 1954, describing the heat-retention electrode elements.

The "idling" elements 3 and 3' physically contact the sides of the adhesive surface C, and any squeeze-out adhesive from the surface will be spaced from the "live" elements 1 and 1', and will be in a lower voltage field with consequent less opportunity for arcing. The remaining area of the adhesive surface C is spaced away from the points of high electric strain and the tendency to arc is reduced to negligible levels. The adhesive surface C will be set by the R.F. field of force as the dominant lines will travel through the adhesive and accomplish parallel bonding. The heat stored in the dielectric layers 2 and 2' will heat the "idling" elements 3 and 3', so that they will heat the edges of the adhesive surface by conduction.

Moving webs F of end jointed pieces F¹ of cedar wood in 1" x 10" cross-section, with finger joints each with adhesive surfaces C, 15" to 20" apart, similarly disposed between heat-retention electrodes D and D¹, and continuously pressed so as to be moved forward through the electrode elements was carried out. Electrodes of sixteen feet in length with the "live" elements 1 and 1' energized with an electronic generator of 70,000 B.t.u. per hour output rating, were used with a web of wood moved at speeds exceeding seventy feet per minute with the result that a 100% urea-melamine adhesive surface C in the finger joints was cured solid as soon as the web of ribbon F emerged from the electrode elements. In the continuously-moving method of curing the adhesive in finger joints of 1" x 4" Douglas fir stock, speeds of 100 feet per minute and above have been attained using the effect of parallel bonding, applied to the joints between heat-retention electrode configurations D and D¹.

We claim:

1. The herein described continuous process of end gluing of pieces of dielectric material in which the abutting ends of the pieces have areas that are covered with a film of adhesive that extends between opposite lateral sides of the pieces; the lengthwise dimensions of the pieces being greater than their widths; the steps of: urging the ends of the pieces toward one another while continuously moving them in the directions of their lengths so as to hold the end of one piece in interlocking relation with the end of the other piece; in establishing a high frequency field of force which will extend between the opposite lateral sides of the moving pieces with the dominant lines of force passing through said adhesive film in a parallel direction therewith for setting the adhesive; and in creating heating areas on each side of the moving pieces and within the high frequency field of force by the action of the high frequency field of force and in conveying this heat by conduction to the areas of the abutting areas of adhesive disposed adjacent to the lateral sides of the pieces for setting these areas and for setting any squeeze out adhesive while the pieces are in continuous movement, and in delivering pieces of material with their ends provided with a film of adhesive and continuously moving them through the high frequency field of force for setting the adhesive on the ends as well as setting any squeeze out adhesive.

2. In combination: a pair of metallic idling electrodes spaced apart in parallel relation and acting as guides for pieces of dielectric material whose dimensions lengthwise are greater than their widths and that have adhesive films between their abutting ends that are to be end bonded as the pieces are continuously moved between the idling electrodes in the directions of their lengths; a pair of high loss dielectric members contacting the outer surfaces of the idling electrodes and being coextensive therewith; and a pair of live electrodes contacting the outer surfaces of the high loss dielectric members for heating them when the live electrodes are connected to a source of high frequency current and also for establishing a high frequency field of force between the live electrodes, the dominant lines of force of which will flow through the adhesive films for setting them; the high loss dielectric members when heated, also heating the idling electrodes by conduction which in turn will heat the areas of the adhesive films disposed adjacent to the lateral sides of the pieces for setting these areas and for setting any squeeze out adhesive, and means for delivering said pieces of material to and continuously moving them between said idling electrodes, said means including driving members engagable with said pieces of material.

References Cited in the file of this patent

UNITED STATES PATENTS

| | | |
|---|---|---|
| 1,444,611 | Johansson | Feb. 6, 1923 |
| 2,388,824 | Brown | Nov. 13, 1945 |
| 2,434,573 | Mann et al. | Jan. 13, 1948 |
| 2,463,054 | Quayle | Mar. 1, 1949 |
| 2,705,993 | Mann et al. | Apr. 12, 1955 |
| 2,824,200 | Mann et al. | Feb. 18, 1958 |
| 2,908,600 | Nicholson | Oct. 13, 1959 |